UNITED STATES PATENT OFFICE 2,638,998

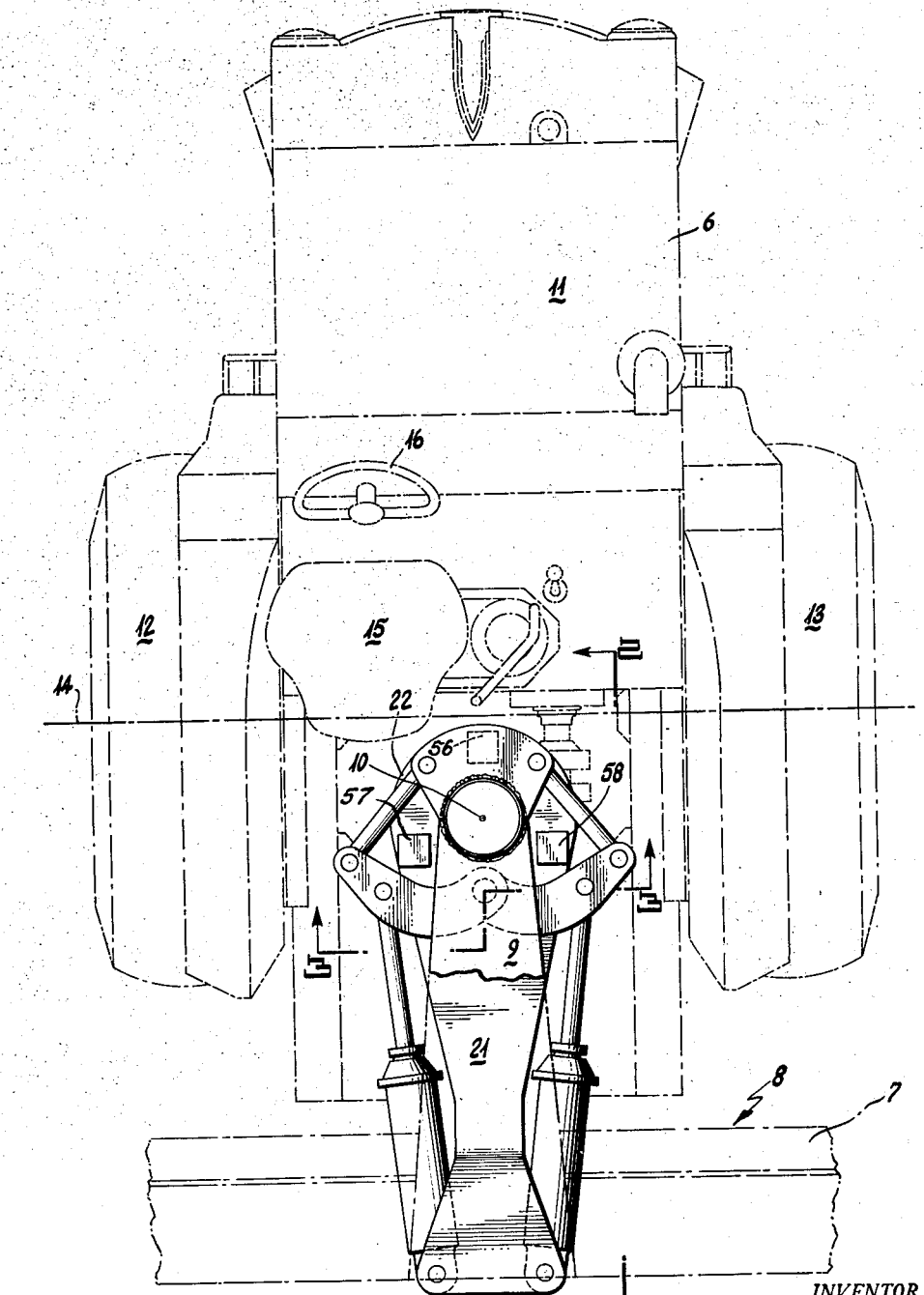
FIG_1

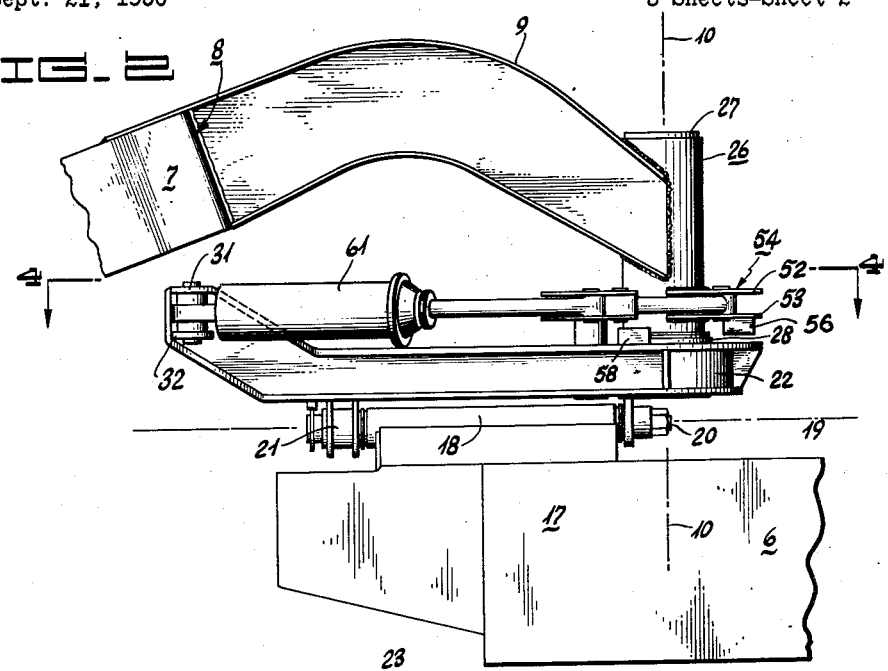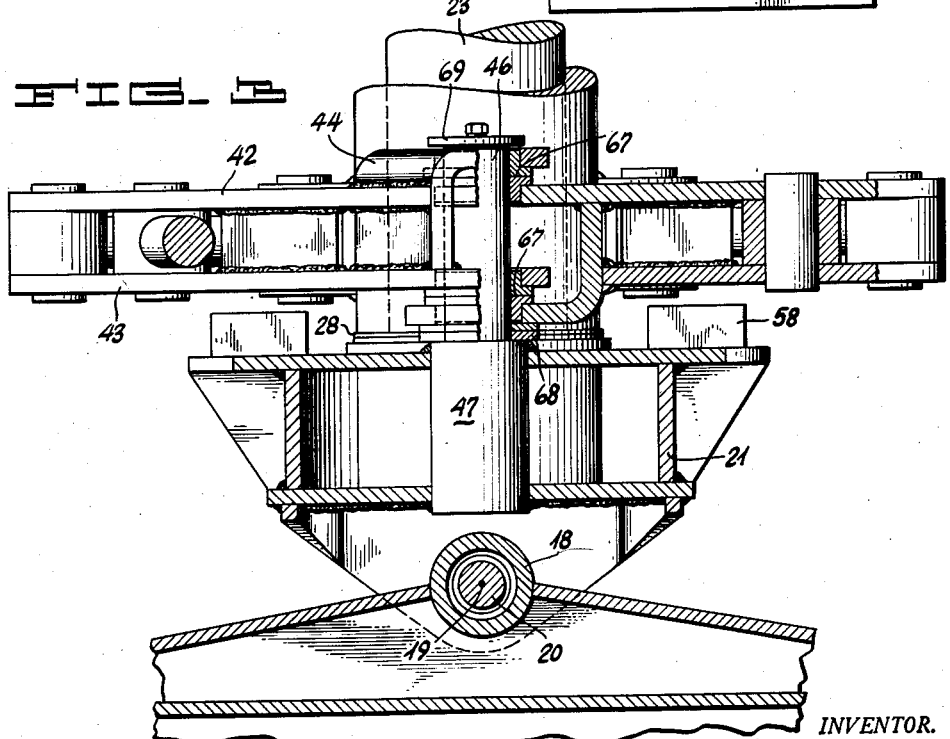

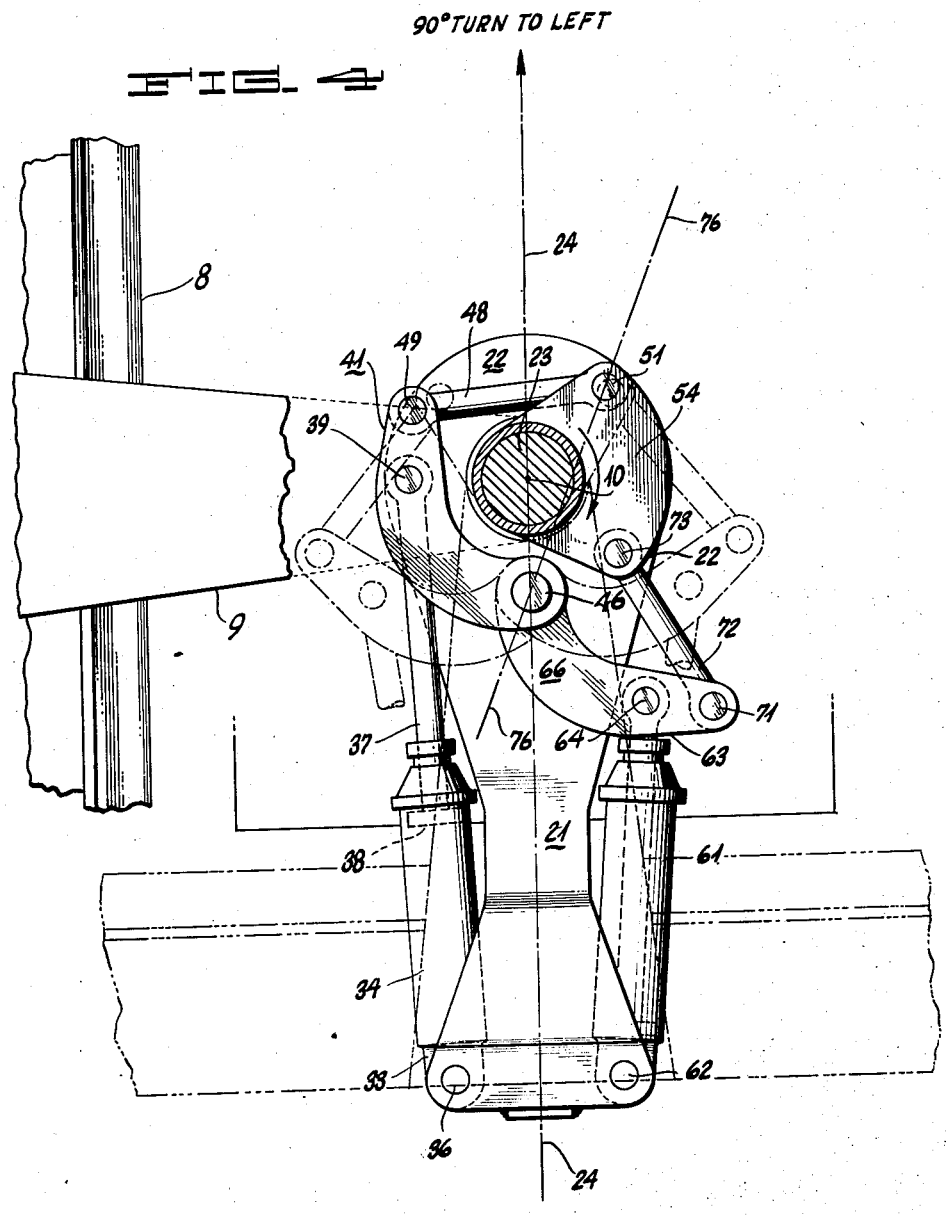

HYDRAULIC POWER STEERING MECHANISM

Harvey W. Rockwell, Cedar Rapids, Iowa, assignor, by mesne assignments, to Allis-Chalmers Manufacturing Company, a corporation of Delaware Application September 21, 1950, Serial No. 186,043

9 Claims. (Cl. 180—79.2)

My invention relates to mechanisms for steering vehicles and is especially concerned with a structure for steering vehicles of the off-highway or earthmover type usually comprising a two-wheel tractor articulated with a trailer about a vertical pivot axis at least. The tractor is normally a rubber tired, power vehicle and the trailer usually has two wheels disposed at some distance from the pivot axis and helping to support some sort of earth carrying structure such as a wagon or scraper. Mechanism is provided for varying and holding the angular relative rotation of the vehicles about the vertical or "fifth wheel" axis. Because of the large size of the vehicles usually so constructed, it is customary to effectuate the relative pivotal movement between the tractor and the trailer by power means such as a hydraulic actuator suitably applied and controlled. It is also customary to provide for transverse oscillation of the tractor with respect to the trailer, usually about a longitudinal, horizontal axis coplanar with the steering pivotal axis.

Under many operating circumstances, all of the steering movement necessary is a relatively small pivotal rotation between the tractor and trailer to either side of a central, normal position. Under other circumstances, it is highly advisable to afford a pivotal movement about the vertical steering axis from a normal straight-ahead position to at least 90 degrees to either side, a total steering swing through a half circle or 180 degrees.

Various successful structures for this general type of steering have been proposed and have been built but most of them are restricted to steering angles much less than 90 degrees either side of center. The problem is sometimes met with a rotary hydraulic actuator, but it is preferred to utilize linear hydraulic devices. A representative device of this sort is disclosed in Patent 2,362,262 to H. C. French, issued November 7, 1944. French's structure contains levers operated by single-acting hydraulic jacks and connected by a flexible chain to a sprocket on the steered vehicle. This structure, though effective within its range, does not provide a rugged and compact control of large-angle steering motion between the tractor and the trailer.

It is therefore an object of my invention to provide a steering mechanism effective to steer a tractor and trailer relative to each other through an angle of approximately 90 degrees either side of the straight-ahead, normal position.

A further object of the invention is to provide such a steering mechanism incorporating hydraulic steering jacks of the linear type.

A still further object of the invention is to provide, for safety and for manufacturing economy, a steering mechanism in duplicate halves, either alone being effective, though with reduced power, fully to steer the tractor-trailer combination.

Another object of my invention is to provide double acting jacks and appropriate connections so that both a pulling and a pushing effort can be realized to result in reasonably uniform turning effort through 180 degrees from linear jacks.

Another object of my invention is to relate the steering mechanism with the pivot mechanism of the tractor and trailer so that the clearances between the moving parts are adequate even though steering is effectuated through wide angles either side of center.

A still further object is to provide an improved steering mechanism.

Other objects, together with the foregoing, are attained in the embodiment of the invention described in the accompanying description and disclosed in the accompanying drawings in which Figure 1 is a plan of the steering mechanism of my invention and some adjacent parts shown in full lines, a typical tractor and part of a trailer being illustrated in broken lines.

Figure 2 is a side elevation, as indicated by the line 2—2 of Figure 1, showing a part of the trailer, a part of the tractor and especially the steering mechanism interconnecting them.

Figure 3 is a cross section to an enlarged scale, the planes of section being indicated by the lines 3—3 of Figure 1.

Figure 4 is a cross section on the plane 4—4 of Figure 2 showing in full lines the orientation of the steering mechanism for a turn of approximately 90 degrees in one direction and showing in broken lines the orientation of the structure for steering straight ahead.

While the steering mechanism of my invention is readily embodied in a number of different forms and is subject to variations depending upon the particular environment in which it is utilized, it has successfully been incorporated in a vehicle combination in which a tractor 6 is utilized with a trailer 7. The trailer is illustrated as part of an earthmover of a standard kind; for example, as shown in the patent to Choate and Austin 2,347,882, issued May 2, 1944.

The trailer includes a transverse yoke 8 and a pair of vehicle supporting rear wheels, not shown, having their rotational axis spaced behind and parallel to the transverse yoke 8. The trailer extends upwardly and forwardly from the yoke in a gooseneck 9 and terminates in the vicinity of a vertical axis 10. This is the common line about which the trailer 7 and the tractor 6 are considered to turn for steering. The tractor includes a source of power located under a hood 11 and effective to drive a pair of ground engaging wheels 12 and 13. The front wheel rotational axis 14 is ahead of the axis 10 and is parallel to the axis of the rear wheels when the vehicle is going straight ahead on the level. At a station 15 for the vehicle operator, a steering wheel 16 is provided so that the operator can manipulate the steering mechanism. Usually such mechanism is driven from the source of power under the hood 11 and includes a hydraulic reservoir, pumping and valving arrangement, not shown, connected to the wheel 16.

The tractor 6 has a main frame 17 in its rearward portion behind the wheels 12 and 13 including a sleeve 18 encompassing a longitudinally disposed horizontal tilt axis 19. The axis 19 is preferably in the median plane of the tractor at right angles to the rotational axis 14 of the wheels 12 and 13.

Coincident with the axis 19 is a shaft 20 extending from the sleeve 18 and held firmly against longitudinal relative motion on a subframe 21. The subframe is substantially an elongated, flat box upswept and broadened at its rearward end and at its forward end enlarged into a drum 22. This serves as the base for a pivot pin 23 upstanding from the subframe approximately on its median line 24 and encompassing the vertical axis 10 which intersects the tilt axis 19. Such intersection is customarily, although not necessarily, at a right angle. The pivot pin 23, with suitable bearings, forms a journal support for a pivot housing 26 encompassing the pin 23 and pivotally related to the subframe 21. Suitable ends 27 and 28 on the pivot housing confine it against vertical, axial motion. The forward portion of the gooseneck 9 merges with the pivot housing 26 and incorporates it in the frame 8 of the trailer as one structure. By this interconnection the trailer and the tractor rotate about the axis 10 for steering even though the trailer, the subframe 21 and the steering mechanism in part rotate about the longitudinal tilt axis 19 in a side to side oscillation.

To establish and confine the relative pivotal steering motion of the tractor and trailer about the axis 10 to the angularity desired by the operator, I provide on the subframe 21 similar or duplicate structures on opposite sides of the center line 24 arranged as mirror images on the left-hand and on the right-hand sides in straight ahead position. The upswept rear part of the subframe at one side provides a pair of ears 31 and 32 straddling a tongue 33 at the rear end of a double acting, hydraulically expansible chamber structure 34. A pivot interconnection is effectuated by a pin 36.

The structure 34 includes a cylinder from which projects a piston rod 37. A piston 38 is on one end of the piston rod and at its other end the piston rod is pivoted by a pin 39 to an intermediate portion of an arcuate, multiplying lever 41. This lever is constructed for symmetry in inverted positions and includes an upper plate 42 and a lower plate 43 between which the piston rod 37 is freely operative. At its fulcrum, the multiplying lever 41 is constructed with an offset axial enlargement 44 and is journalled at spaced points on a mounting pin 46 upstanding from an enlargement 47 firmly fixed in the subframe. In the normal, straight ahead position of the parts, the pin 46 is disposed immediately behind the steering axis 10 and below the gooseneck 9.

The opposite end of the multiplying lever straddles the normally rearward end of a strut 48 to which it is connected by a pivot pin 49. The term "strut" refers to a member which both pushes and pulls. The other end of the strut is connected by a pivot pin 51 to upper and lower plates 52 and 53 of a bracket extension 54 extending forwardly from and fixedly secured to the housing 26 on the side thereof opposite the gooseneck 9. A central stop 56 on the bracket 54 engages side stops 57 and 58 on the subframe to limit the extremes of steering movement.

A quite similar structure is provided on the opposite side of the subframe 21. A duplicate, double acting hydraulically expansible mechanism 61 is connected by a pivot pin 62 at one end to the ears 31 and 32 on the subframe. At its other end the expansible mechanism has a piston rod 63 joined by a pin 64 to a second, arcuate, multiplying lever 66. This has substantially the same construction as the first lever 41 and is similarly provided with an offset.

When both levers are assembled on the fulcrum pin 46, they interleave to provide a mutually straddled mounting, there being appropriate bearings 67 disposed in them to reduce the turning friction and appropriate thrust plates 68 and 69 at their opposite ends. The multiplier levers are appropriately confined to rotation on the fulcrum pin 46. The two lever arms 41 and 66 both turn about the same pivot axis and for the most part occupy the same horizontal planes. The outer end of the lever 66 is connected by a pin 71 to one end of a strut 72 identical with the strut 48. The other end of the strut 72 is joined by a pin 73 to the extension bracket 54, the connection being between the upper and lower plates 53 and 52 in mirror symmetry with the mounting pin 51.

Each of the linear cylinders 34 and 61 is provided at opposite ends with hydraulic connectors, not shown, leading to a standard valve controlling flow of hydraulic fluid under pressure from a driving pump and to a reservoir. The valve is also usually effective in one position to lock the fluid within the hydraulically expansible chambers without inflow or outflow in order to hold the steering mechanism rigidly in a selected position.

The oscillation or lateral tilting of the tractor and trailer are accomplished in the normal way and the relative steering or pivotal movement of the tractor and trailer take place in a normal way about the steering axis 10 but the amount of steering or the angle of steering is much greater than is usual with power devices. When one of the jacks 34, for example, is provided with steering fluid under pressure in its rearmost portion, it is effective to expel the piston rod 37. This in turn oscillates the multiplier lever 41 about the fulcrum pin 46. Since the strut 39 is connected at a radially more remote point, the strut is moved an even greater amount in compression. The strut also moves in a different direction than the linear piston rod due to the different relative locations of the pins 49 and 51 at different parts of the turning cycle. This structure even alone affords an appropriate relative rotation between the trailer and the tractor.

The location of the fulcrum pin 46 with respect to the steering axis 10 and the locations of the pins 36, 39, 49 and 51 are such that in effect the arcuate multiplying lever 42 and the strut 48 considered together, partially encompass the steering housing 26 when large or maximum turns are made. A line 76 drawn through the center of the pin 46 and the center of the pin 51 passes from one side of the steering axis 10 to the other.

Steering motion in one direction is effectuated by a compressive stress in the piston rod 37 and in the strut 48. By a reversal of the hydraulic connections to the cylinder 34 to exert pressure on the forward end of the piston, the piston rod 37 is placed in tension and is withdrawn into the cylinder 34 thus rocking the arcuate lever 31 in the reverse direction and by tensioning the strut 48 causes the opposite steering rotation between the tractor and the trailer. It is thus possible by opposite senses of motion of the hydraulic cylinder, to provide steering of the vehicle throughout 90 degrees from straight ahead position to one side and throughout 90 degrees from straight ahead position to the other side. All of that may be accomplished with but a single hydraulic mechanism and its attendant lever and strut linkage.

Since some of the steering angles are not particularly favorable for the application of power and since it is desired to have a duplicate system in effect for possible emergency and to take excessive loads, the hydraulic mechanism 61 and its connections operate simultaneously with but in the reverse sense with the operation of the cylinder 34. The positions of the parts for a 90 degree turn in one direction are shown in full lines in Figure 4 and a mirror image represents the position of the parts for a full 90 degree turn in the opposite direction from straight ahead position, illustrated by broken lines in Figure 4. The mechanical advantages or leverages of the two duplicate systems complement each other since one system is strong when the other is weak, and vice versa.

As distinguished from some prior practice, double acting cylinders are utilized so that a single one of them can suffice and so that both pushing forces and pulling forces may be utilized for complete 90 degree steering in either direction. As further distinguished from prior practice, there is employed herein a strut which is effective to transmit motion in two opposite directions, both by tension and by compression. The point (for example, 49) of attachment of a strut to the pivot housing 26, from the vantage of the subframe 21, in effect travels around the steering axis 10 while the strut itself (for example, 48) occupies a position other than tangential throughout much of its motion. It is therefore possible to transmit force around a corner, so to speak, from the hydraulic cylinder not only in tension but also in compression. By the provision of double acting hydraulic cylinders operating on arcuate levers connected by struts to the bracket extension, all mounted and disposed and located as disclosed, the tractor and trailer are connected for steering at least 90 degrees in one direction from normal and conversely, a complete 90 degree turn in the opposite direction from normal. All the while the steering is under complete hydraulic control and is hydraulically locked in both tension and compression in any selected position for safety.

What is claimed is:

1. A steering mechanism for a tractor and a trailer comprising a frame, means for connecting said frame to the rearward portion of said tractor for transverse tilting about a longitudinal central axis, a pivot pin on said frame having a substantially vertical axis intersecting said longitudinal axis near the center of said frame, a pivot housing journaled on said pivot pin and interconnected with the trailer, a fulcrum pin on said frame behind said pivot pin and having a substantially vertical axis intersecting said longitudinal axis, levers journaled at their inner ends on said fulcrum pin and extending in opposite directions therefrom, hydraulic jacks at one end mounted on the rearward part of said frame and at the other end engaging an intermediate part of said levers, an extension bracket on the forward part of said pivot housing, struts at one end engaging the outer ends of said levers, and transversely spaced pivot connections between the other end of said struts and said extension bracket.

2. A steering mechanism for a tractor and a trailer comprising a frame, a longitudinal pivot for connecting said frame to the rearward portion of said tractor for relative transverse tilting about a longitudinal central axis, a pivot pin on said frame having a substantially vertical axis intersecting said longitudinal axis near the center of said frame, a pivot housing journaled on said pivot pin and interconnected with the trailer, a fulcrum pin on said frame behind said pivot pin and having a substantially vertical axis intersecting said longitudinal axis, levers journaled at their inner ends on said fulcrum pin and extending in opposite directions therefrom, each of said levers being curved to extend around said pivot housing, a pair of double acting hydraulic jacks each being at one end mounted on the rearward part of said frame behind said pivot pin and at the other end engaging an intermediate part of one of said levers, an extension bracket on the forward part of said pivot housing ahead of said pivot pin, a pair of transversely spaced pivot connections on said housing ahead of said pivot pin, and a pair of struts converging in a forward direction, each of said struts at one end engaging the outer end of one of said levers and at the other end engaging a respective one of said pivot connections.

3. A steering mechanism for a tractor and a trailer comprising a frame, means for connecting said frame to said tractor to pivot about a longitudinal horizontal axis, a pivot pin upstanding from said frame, a pivot housing journaled on said pivot pin and connected to said trailer, a pair of levers pivoted to said frame about an axis on one side of said pivot pin, struts pivoted to and extending from the ends of said levers, pivot connections between the struts and said housing on the other side of said pivot pin, and a pair of double acting hydraulic jacks pivotally connected at one end to said frame and at the other end to said levers intermediate the ends thereof.

4. A steering mechanism for a tractor and a trailer comprising a frame, means for connecting said frame and said tractor, a pivot pin upstanding from said frame, a pivot housing journaled on said pivot pin and connected to said trailer, a lever at one end pivoted to said frame behind said pivot pin, a strut pivoted to said lever at the other end thereof, a pivot connection between said strut and said pivot housing forward of said pivot pin, and a double-acting hydraulic jack pivotally connected at one end to said frame and at the other end to said lever between the pivot connections to said frame and said strut whereby said strut and lever may jackknife around said housing.

5. A steering mechanism for a tractor and a trailer comprising a frame, a pivot pin upstanding from said frame, a pivot housing journaled on said pin, an extension bracket secured to and in the straight ahead position being on the central forward part of said pivot housing, a fulcrum pin secured to and in the straight ahead position being on the central rearward part of said frame, levers mounted on said fulcrum pin and extending outwardly therefrom beyond said pivot housing with radii such that circles scribed by said radii would enclose the axis of said pivot pin, hydraulic jacks connected at one end to said levers and at the other end to said frame, struts connected to said levers, and pivot connections between said struts and said extension bracket at points spaced transversely of said bracket.

6. A steering mechanism for a tractor and a trailer comprising a frame, means for connecting said frame to said tractor, a pivot pin upstanding from said frame, a pivot housing journaled on said pivot pin and connected to said trailer, a first pivot connection on said frame on one side of said pivot pin, a lever pivoted on said first pivot connection, a strut pivoted to one end of said lever, a second pivot connection on said housing on the other side of said pivot pin from said first pivot connection, an end of said strut being pivoted on said second pivot connection, said pivot connections being located in such proximity to said pivot pin so that said lever, said strut and a line connecting said first and second pivot connections triangularly encompass the axis of said pivot pin when said trailer executes a 90° turn, and a hydraulic jack pivotally connected at one end to said frame and at the other end to said lever.

7. In a steering mechanism for a tractor and a trailer comprising a frame, a pivot pin upstanding from said frame, a pivot housing journaled on said pin and connected to said trailer, the combination of: a first lever connected at one end to said frame, a second lever connected at one end to said housing, the free ends of said levers being pivotally interconnected, said levers comprising a linkage having substantially a V-configuration which in all positions of said tractor and said trailer encloses a maximum angle of no more than approximately 90°, and a hydraulic jack connected at one end to said frame and at the other end to one lever in said linkage.

8. A steering mechanism for a tractor and a trailer comprising a first element including a frame, and a first pivot member upstanding from said frame; a second element including a second pivot member journaled with respect to said first pivot member, and a connection between said second pivot member and said trailer; means for connecting said first element to said tractor to pivot about a longitudinal horizontal axis; a pair of levers pivoted to one of said elements about an axis on one side of said pivot members; struts pivoted to and extending from the ends of said levers; pivot connections between the struts and the other of said elements on the other side of said pivot members; and a pair of double acting hydraulic jacks pivotally connected at one end to said one of said elements and at the other end to said levers intermediate the ends thereof.

9. A steering mechanism for a tractor and a trailer comprising a first element including a frame, and a first pivot member upstanding from said frame; a second element including a second pivot member journaled with respect to said first pivot member, and a connection between said second pivot member and said trailer; means for connecting said first element and said tractor; a lever at one end pivoted to one of said elements behind said pivot members; a strut pivoted to said lever at the other end thereof; a pivot connection between said strut and the other of said elements forward of said pivot members; and a double acting hydraulic jack pivotally connected at one end to said one of said elements and at the other end to said lever between the pivot connection to said one of said elements and said strut whereby said strut and said lever may jackknife around said pivot members.

HARVEY W. ROCKWELL.

References Cited in the file of this patent

UNITED STATES PATENTS

| Number | Name | Date |
|---|---|---|
| 2,362,262 | French | Nov. 7, 1944 |
| 2,519,742 | Collender | Aug. 22, 1950 |